Patented Mar. 15, 1927.

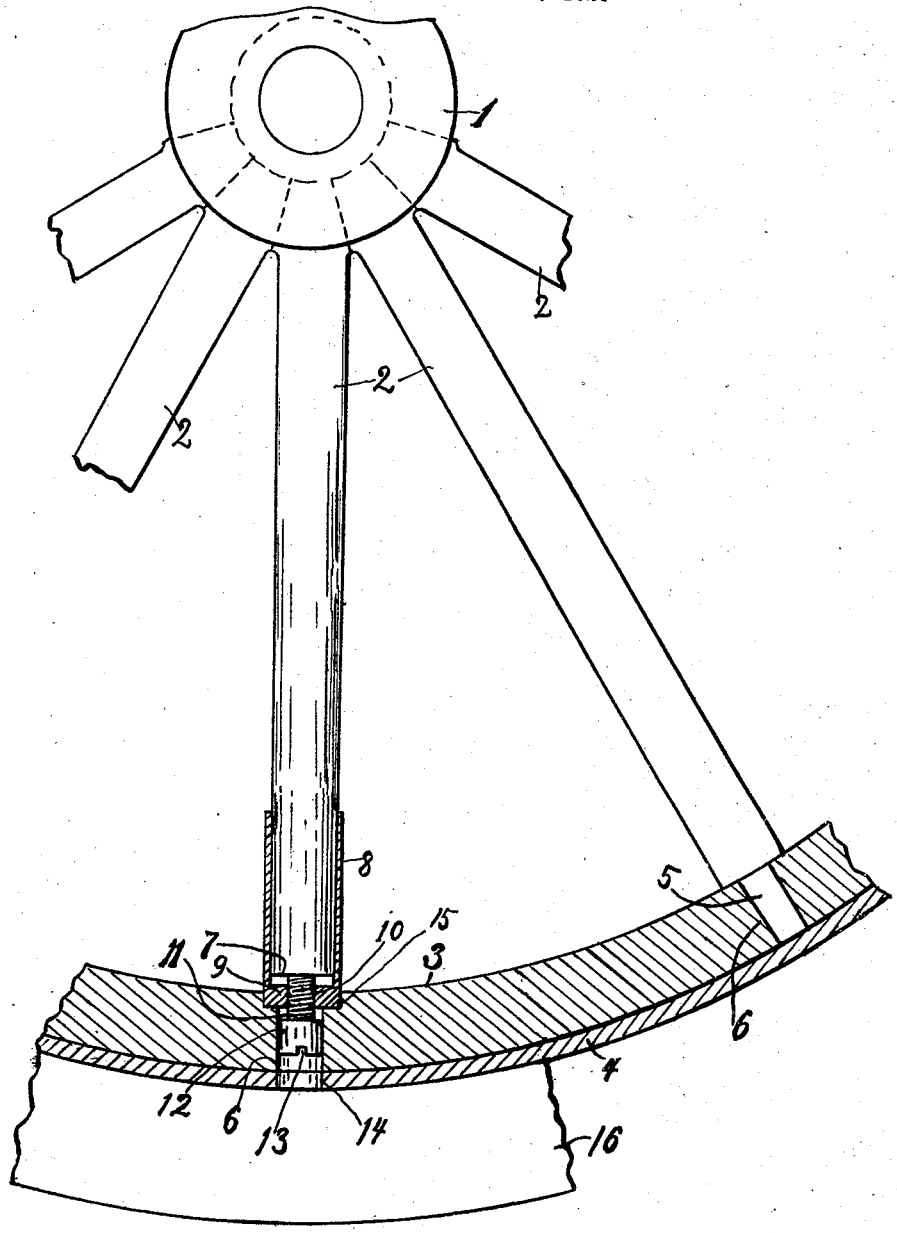

1,620,905

UNITED STATES PATENT OFFICE.

EINAR H. MADSEN, OF CHOKIO, MINNESOTA.

ADJUSTABLE SPOKE.

Application filed February 2, 1925. Serial No. 6,473.

My invention relates to improved means for repairing wheels when the spokes become loose in the felly by wear or by decay, which frequently occurs where both the spokes and the felly are made of wood.

The accompanying drawing is a partly sectional side elevation of a portion of a vehicle wheel having my invention applied to it.

In said drawing 1 is the hub of the wheel from which radiates any desired number of wooden spokes 2 which are normally secured in a wooden felly 3 having a metallic tire 4 shrunk on it and secured in any ordinary manner, as are also the spokes. The latter are usually formed each with a round tenon 5 (as shown to the right in the drawing) inserted in a bore 6 in the felly.

After some wear and tear and the action of moisture the spokes will get loose or even break adjacent the inner curve of the felly, and the wheel becomes unfit for use. To repair such a wheel I saw the spoke off at the point 7 so as to reach the undecayed wood in it. I also trim the spoke to cylindrical form, say about two inches of its length and upon that outer end portion of the spoke I place a snugly fitting metal sleeve 8 having a heavy bottom or end 9 with a threaded hole 10 concentric thereof. In said hole is threaded a screw 11 having a suitable head 12 with a notch 13 or other means for engaging it for turning.

Said screw head 12 fits guidingly in the bore 6, which in case of decay may have to be re-bored so as to guide the screw head. The tire 4 must of course have a bore 14 large enough for the screw head to pass through or at least for a screw driver to be inserted to turn the screw.

As a further improvement I may also give the felly cavities 15, one for each spoke sleeve 8 to engage in, and thereby the fitting of the screw head in the bore 6 is of less importance.

Where the wheel is for an automobile it may be given any kind of a rubber tire 16 upon the tire 4 or may have a demountable rim (not shown).

In the use of the device, after the parts are arranged as shown the screws 11 (one at each spoke) are turned and by pressing against the outer ends of the wooden spokes 2 cause the sleeves 8 to press outward against the felly and thus to renew the firmness of the spokes. If slackness of the spokes occurs again the remedy is simply to rotate the screws and thereby force the sleeves 8 outwardly against the felly.

What I claim is:

In a vehicle wheel, the combination of a felly having radial bores for its spokes and wooden spokes, said bores being of larger diameter in their inner than in their outer portions, so as to form an internal shoulder in the bore, a metallic thimble slidable on the outer end portion of each spoke and having its bottom end resting against the internal shoulder and its bottom provided with a central threaded hole, and a screw in each of said threaded holes and bearing with its end against the end of the spoke in the thimble and having its outer end extending into the smaller portion of the bore and there adapted to be turned by a suitable tool.

In testimony whereof I affix my signature.

EINAR H. MADSEN.